Sept. 1, 1953     O. G. COWARD     2,650,393
SCREEN STRUCTURE

Filed Sept. 23, 1948     2 Sheets-Sheet 1

INVENTOR
OLGAR G. COWARD
BY Lester B. Clark
& Ray L. Smith.
ATTORNEYS

Sept. 1, 1953 O. G. COWARD 2,650,393
SCREEN STRUCTURE
Filed Sept. 23, 1948 2 Sheets-Sheet 2

INVENTOR
OLGAR G. COWARD
BY Lester B. Clark
& Ray L. Smith
ATTORNEYS

Patented Sept. 1, 1953

2,650,393

UNITED STATES PATENT OFFICE 2,650,393

SCREEN STRUCTURE

Olgar G. Coward, Beaumont, Tex., assignor to Alumalath Corporation of Texas, Beaumont, Tex., a corporation Application September 23, 1948, Serial No. 50,685

1 Claim. (Cl. 20—57.5)

This invention relates to screening structures, such as awnings, which are comprised of notched runners adapted to receive weatherproofed slats of metal or similar substances of a pliability to be fitted into the runner notches as panel elements.

It is an object of this invention to provide a screening structure, or awning, which has a plurality of parallel extending runners having notches into which pliable weatherproofed slats of metal or similar substances may be sprung as panel elements.

It is another object of this invention to provide a structure of this class in which the notch bases overlap the adjacent notch apices successively from head to foot of each runner so that slats of widths greater than the distance from the apex to the base of a notch may be sprung into transversely aligned runner notches to overlay the runners and each other.

It is a further object of this invention to provide a structure of this class having the top thereof pivotally connected to an upright structure, as the outside of a building in the vicinity of the top of a window, and which may have the bottom thereof spaced away from the upright structure so as to provide an awning over the window.

It is a further object of this invention to provide a structure of this class in which the slats take a definite arcuate configuration in the runner notches so that light and air may pass endwise beneath the slats to light and space therebeneath in cases when a triangular sheet element may be employed to space the runners from the upright structure to which the runners are pivotally connected at the top thereof.

It is still a further object of this invention to provide a structure of this class which is not only adapted for use as an awning, but which may be used for shutters, for porch and terrace screens, and as covers for sidewalks, door stoops, patios, and in other diverse architectural combinations.

It is still a further object of this invention to provide a structure of this class in which the notch bases overlay the adjacent notch apices successively from head to foot of each runner in such a manner that light and air may pass beneath the slats in such awning and into the area beneath the structure.

It is a further object of this invention to provide a structure of this class which is pivotally connected to an upright at the runner heads and which is provided with means for spacing the runners at various distances from the upright, thereby varying the angle at which light and air may pass into the area beneath the structure.

It is a further object of this invention to provide a structure of this class in which the holes in the parallel extending runners are in transverse alignment so that a plurality of runners may be riveted or bolted together for strength purposes in case of a heavy, a high, or a wide unit being required.

It is yet another object of this invention to provide a structure having slats which are weatherproofed and pliable.

It is a further object of this invention to provide an awning of this class in which the runner heads and the top slat are overhung by a hood slat.

Other and further objects of this invention will be obvious when the specification is considered in connection with the drawings, in which.

Figure 1:
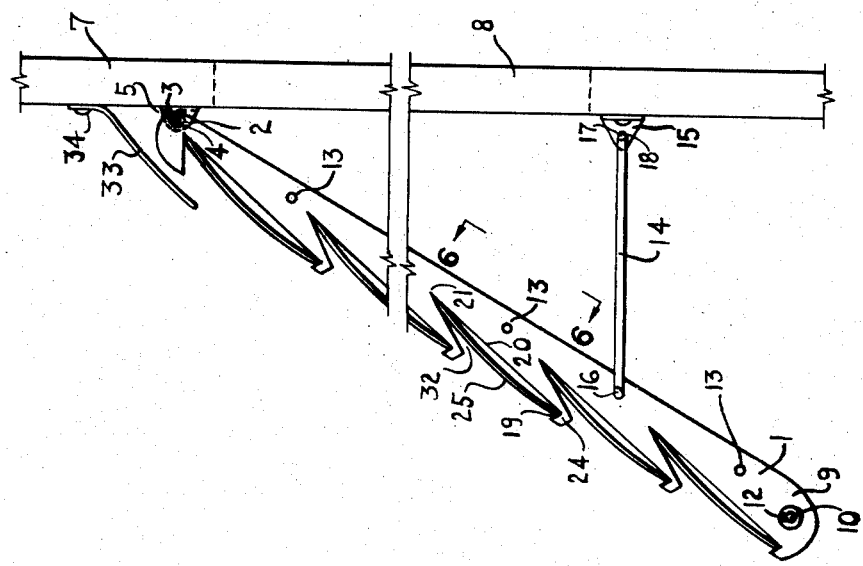
Fig. 1 is a side view of the structure when connected to an upright.

In the embodiment of the invention disclosed, the structure thereof is shown typically adapted as an awning over a window.

A runner 1 has a head 2 bored at 3 to receive a spacer rod 4 which passes therethrough; and a bracket 5 is provided which is also bored to receive the rod 4 and which is adapted for connection to the upright 7 which could be the side of a wall above the window opening 8. The rod 4 may pass through two or more runners 1 as may be needed, dependent upon the width of the awning required.

Each runner 1 has a foot 9, and the runners are spaced apart at the bottom thereof by the spacer rod 10 which passes through each runner foot and which is connected thereto as by the collars 11 and set screws 12 or preferably speed nuts may be used for this purpose. Holes 13 are provided in each runner, into which may be fitted the projection rod 14 which is pivotally mounted to the bracket 15 which in turn is fixed to the upright 7 at some convenient distance, preferably some point below the window 8. A series of these projection rods 14 may be provided, of various lengths but having standardized shanks 16 and 17 to fit, respectively, into the holes 13 in the runners 1 and the holes 18 in the brackets 15. Preferably, however, it is only necessary to provide one length of projection rod 14 which may space the end runners 1 of an awning assembly at various distances from the upright 7 merely by shifting the projection rod 14 from one hole 13 in a runner to another hole 13 therein.

Figure 3:
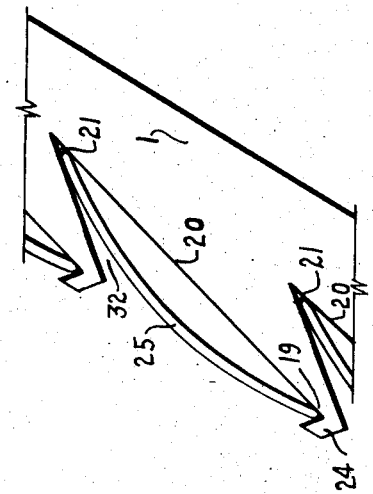
Fig. 3 is an enlarged fragmentary end view of a section of the structure showing the configuration of the runner notches and of the slats when fitted thereinto.

As shown most clearly in Fig. 3, the runners are notched on the upwardly extending parts thereof so that the bases 19 of one notch 20 will overlie the apices 21 of the next adjacent notch 20 therebelow. This results in forming toes or fingers 24 at spaced intervals along the runners, which fingers are the only runner portions which are visible from the awning exterior after slats 25 have been sprung into transversely aligned notches of the parallel extending runners 1.

Figure 5:
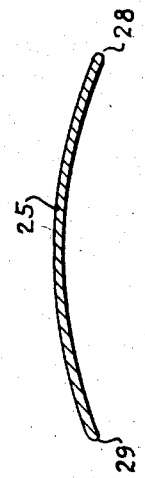
Fig. 5 is a sectional view of a slat taken along line 5—5 of Fig. 4.
Figure 4:
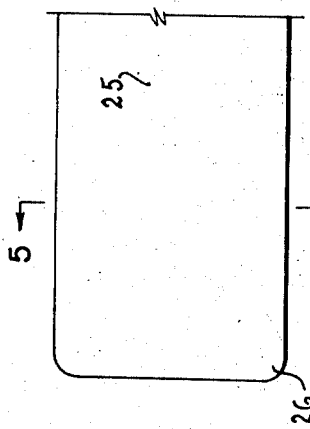
Fig. 4 is an enlarged fragmentary plan view of a slat.

In normal configuration, the slats 25 have rounded corners 26, as shown in Fig. 4, and are of a slightly arcuate cross-sectional contour, as shown in Fig. 5. These slots may be of any pliable substance which is of a weatherproof nature, and sheet metal strips which are weatherproofed, as by painting, are preferably used. However, other pliable materials may be employed which are susceptible to weatherproofing, as galvanized sheets, or a non-ferrous metal may be employed which is itself rust-proof, thereby obviating the need for weatherproofing.

It may be preferred to space the awning runners from the upright by a solid sheet member, not shown, of substantially triangular shape, in place of employing the projection rods 14, and when this is done the base of such triangular sheet is connected to the upright in any well known manner while the hypotenuse thereof is connected to the runners, as by bolts through the holes 13.

It is also possible to eliminate the spacer rod 4 which connects the runner heads 2 together; and in this case individual bolts may connect each runner head 2 and bracket 5, the brackets 5 in turn being located at spaced horizontal distances along the upright 7.

Figure 2:
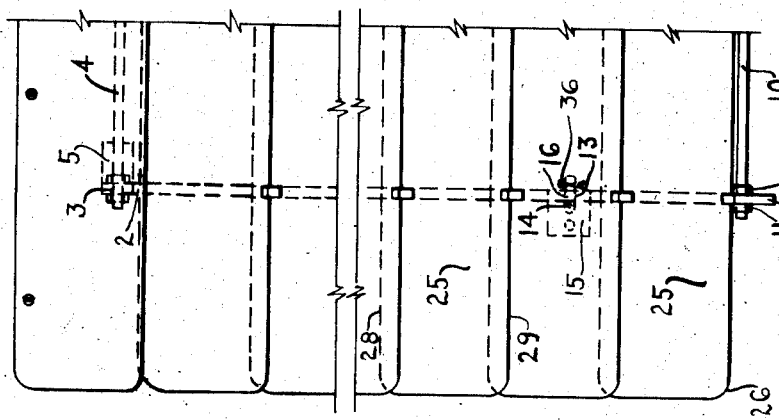
Fig. 2 is a front elevation of a section of the structure.

Substitution may be made for the cotter pin 36 shown in Fig. 2 for holding the projection rod shank 16 in the hole 13, and also for such a pin, not shown, for holding the shank 17 in the bracket hole 18, and any well known fastening device will serve for such purposes.

A construction may also be provided in which the slats 25 may be notched in any well known manner to fit in either the notched apices 21 or the notched bases 19, or both, and such slats may be of sufficient strength to maintain the runners spaced apart in this manner alone, thereby obviating the necessity of the spacer rod 10.

The normal straight-line distance from an edge 28 to an opposite edge 29 of a slat is greater than the distance from the base 19 to the apex 21 of any notch in which the slats may be fitted, with the result that when the slats are sprung into the notches the chord height from notch 20 to slat 25 is increased to a greater chord distance than this distance as measured when the slat is not in place and is in its normal shape.

The notch apices 21 extend to such depth in the awning and the notch bases 19 are cut to overlie the apices in such a manner that light may be reflected upwardly through the openings 32 between adjacent slats 25, when the slats are fitted into the notches, but at the same time each slat successively overlies the adjacent slat therebelow in such a manner as to successfully retard water, as rain or storm water, from being splashed upwardly through the opening 32 so as to fall down into the space which the awning is installed to protect.

Figure 6:
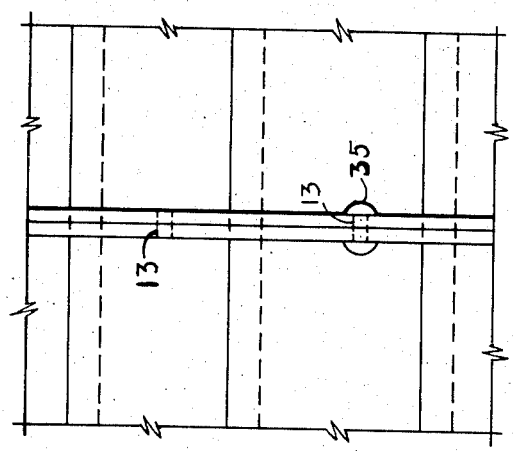
Fig. 6 is a fragmentary bottom view of the structure showing how two runner sections may be joined together for strength purposes.

The simple structures which constitute the basis of this invention are so designed as to permit great flexibility in awning dimensions. In cases, it may be found necessary to provide runners, stronger than ordinary, to support the weight of long slats which may be required, and in such cases it may be practical, as shown in Fig. 6, to appropriate aligned holes 13 in the runners 1 as rivet or bolt holes so that two or more runners 1 may be joined together, as by rivets 35, to provide stronger runner members. The height of the awnings provided may also be varied by providing runners of various lengths.

It is pointed out that the runner heads above the top slat have to be hooded, and in the embodiment of the invention disclosed, a hood slat 33 is provided and fixed to the upright member, as by the screws 34.

Although the slats, as hereinabove disclosed, are shown to be of arcuate or crowned contour, such contour is not essential to the operation of the invention and flat slats may be provided.

It may also be found practicable, on occasion, to employ slats which are not wider than the distance from notch apex to base, and such slats may be slid from one side into a plurality of transversely aligned notches on parallel extending runners. On such occasion, however, it should be necessary to provide some well known means to insure against transverse dislocation of the slats.

It is herein pointed out however that, as regards the slats, the ordinary slat of a width to be sprung into the notches need not be notched itself to provide against transverse dislocation, as the friction of the aligned runner notches at spaced distances apart proves ample in practice to provide thereagainst.

It is obvious that this screening structure is not limited to use for awning alone but may be employed in many diverse architectural combinations. It may be employed as the panel structure at screens, shutters, porches, terraces, sidewalks, door stoops, patios and may broadly be employed in any number of other constructions. The features whereby the runner notches receive slats or panels which successively overlay each other by virtue of the particularly notched construction of the runner constitutes a feature susceptible to various adaptations. Additionally, distinct advantages are obtained, within the objects of this invention, by notching the runners along one edge only so that all of the slats may be fitted from the same runner side.

What is claimed is:

An awning assembly comprising, a plurality of substantially parallel extending, substantially straight runners having the outer edge faces thereof notched to form longitudinally and uniformly spaced apart, transversely extending members with converging, substantially straight sides outwardly and downwardly extending, and with a toe upstanding from the upper side adjacent the convergence of said sides so that the toe piece and the upper side form a lower notch and the convergence of the upper side and lower side of the adjacent member thereabove form an upper notch, said lower notches being uniformly dimensioned and said upper notches being uniformly dimensioned whereby the lower notches uniformly overlie the upper notches adjacent thereto therebelow, means for pivotally connecting the heads of said runners to an upright structure, a plurality of pliable, substantially uniform width slats of greater width than the length of the upper side of a member, said slats being adapted to have their upper sides inserted into the aligned upper notches of said runners and to be bent arcuately transversely so that their lower sides may be sprung into the aligned lower notches of said runners immediately therebelow, and means pivotally connected on at least one end and connected at one end to at least one of said runners and at the other end to said upright and adapted to space said runners in a plurality of spaced distances from said upright.

OLGAR G. COWARD.

References Cited in the file of this patent

UNITED STATES PATENTS

| Number | Name | Date |
|---|---|---|
| De. 105,019 | Jones | June 22, 1937 |
| 529,737 | Lash | Mar. 27, 1894 |
| 552,997 | Harry | Jan. 14, 1896 |
| 1,394,656 | Vail | Oct. 25, 1921 |
| 1,941,308 | Indahl | Dec. 26, 1933 |
| 2,015,342 | Indahl | Sept. 24, 1935 |
| 2,075,135 | Reynolds | Mar. 30, 1937 |
| 2,389,970 | Ferguson | Mar. 27, 1945 |
| 2,394,736 | Adelsperger | Feb. 12, 1946 |
| 2,441,081 | Perry et al. | May 4, 1948 |
| 2,458,619 | McKinley | Jan. 11, 1949 |
| 2,485,263 | Digby | Oct. 18, 1949 |
| 2,546,386 | Ciciarelli | Mar. 27, 1951 |